(12) United States Patent
George et al.

(10) Patent No.: US 11,693,417 B2
(45) Date of Patent: Jul. 4, 2023

(54) GENERATING TRAINING DATA USING SIMULATED ENVIRONMENTS AND TRAINING MACHINE LEARNING MODELS FOR VEHICLE GUIDANCE

(71) Applicants: VOLKSWAGEN AKTIENGESELLSCHAFT, Wolfsburg (DE); DR. ING. H.C. F. PORSCHE AKTIENGESELLSCHAFT, Stuttgart (DE); AUDI AG, Ingolstadt (DE)

(72) Inventors: Nikhil George, Palo Alto, CA (US); Samira Pouyanfar, Miami, FL (US); Muneeb Saleem, Mountain View, CA (US); Elnaz Vahedforough, San Jose, CA (US); Samuel Zeitvogel, Rheinstetten (DE)

(73) Assignees: VOLKSWAGEN AKTIENGESELLSCHAFT, Wolfsburg (DE); DR. ING H.C. F. PORSCHE AKTIENGESELLSCHAFT, Stuttgart (DE); AUDI AG, Ingolstadt (DE)

( * ) Notice: Subject to any disclaimer, the term of this patent is extended or adjusted under 35 U.S.C. 154(b) by 313 days.

(21) Appl. No.: 16/819,076

(22) Filed: Mar. 14, 2020

(65) Prior Publication Data
US 2020/0293054 A1    Sep. 17, 2020

Related U.S. Application Data

(60) Provisional application No. 62/819,082, filed on Mar. 15, 2019.

(51) Int. Cl.
*G05D 1/02*    (2020.01)
*G06N 3/04*    (2023.01)
*G06N 20/00*   (2019.01)

(52) U.S. Cl.
CPC ............. *G05D 1/0221* (2013.01); *G06N 3/04* (2013.01); *G06N 20/00* (2019.01); *G05D 2201/0213* (2013.01)

(58) Field of Classification Search
CPC ......... G05D 1/0221; G05D 2201/0213; G06N 20/00; G06N 3/04
See application file for complete search history.

(56) References Cited

U.S. PATENT DOCUMENTS

2017/0132334 A1*  5/2017  Levinson .............. G01S 17/931
2018/0060701 A1*  3/2018  Krishnamurthy ..... G06F 16/583
(Continued)

*Primary Examiner* — Ramsey Refai
(74) *Attorney, Agent, or Firm* — Womble Bond Dickinson (US) LLP

(57) ABSTRACT

A method includes generating a first simulated environment. The first simulated environment includes a route for a simulated vehicle. The method includes determining a set of locations within the first simulated environment for a set of objects. The method includes determining a path for the simulated vehicle based on the route and set of locations. The method includes generating a set of simulated environments based on the first simulated environment and set of locations. The method includes generating a set of images based on the set of simulated environments, the path, and the set of non-deterministically generated objects. The non-deterministically generated objects include unrealistic objects and optionally include realistic objects. The method includes training vehicle guidance models using the set of images which may include abstract or unrealistic objects. The trained vehicle guidance models may be directly used on real vehicles in corresponding real world environments.

20 Claims, 9 Drawing Sheets

(56) References Cited

U.S. PATENT DOCUMENTS

| | | | |
|---|---|---|---|
| 2018/0247160 A1* | 8/2018 | Rohani | G06N 3/0454 |
| 2019/0113917 A1* | 4/2019 | Buch | G05D 1/0285 |
| 2019/0303759 A1* | 10/2019 | Farabet | G06F 9/455 |
| 2019/0382007 A1* | 12/2019 | Casas | G06N 20/00 |
| 2020/0110416 A1* | 4/2020 | Hong | G01C 21/3602 |
| 2020/0231177 A1* | 7/2020 | Ferzli | G06F 16/957 |
| 2020/0249685 A1* | 8/2020 | Elluswamy | G05D 1/0214 |

\* cited by examiner

GENERATING TRAINING DATA USING SIMULATED ENVIRONMENTS AND TRAINING MACHINE LEARNING MODELS FOR VEHICLE GUIDANCE

CROSS-REFERENCE TO RELATED APPLICATIONS

This application claims the benefit of U.S. Provisional Patent Application No. 62/819,082, filed on Mar. 15, 2019. The disclosure of the above-referenced application is hereby incorporated by reference in its entirety.

TECHNICAL FIELD

Aspects of the present disclosure relate to machine learning models, and more particularly, to generating training data and training machine learning models.

BACKGROUND

As devices become more complex and as more devices operate autonomously (e.g., autonomous vehicles (AVs)), machine learning (ML) models, artificial intelligence (AI) models, etc., are often used to control the operation of these complex and/or autonomous devices. Developing these models may be an expensive and time consuming process. It may be difficult to gather training data and to clean/process the training data. It may also be difficult to select which training data should be used to train a model. Many of the processes or workflows for developing these models is manual (e.g., manually performed by a data scientist/engineer).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
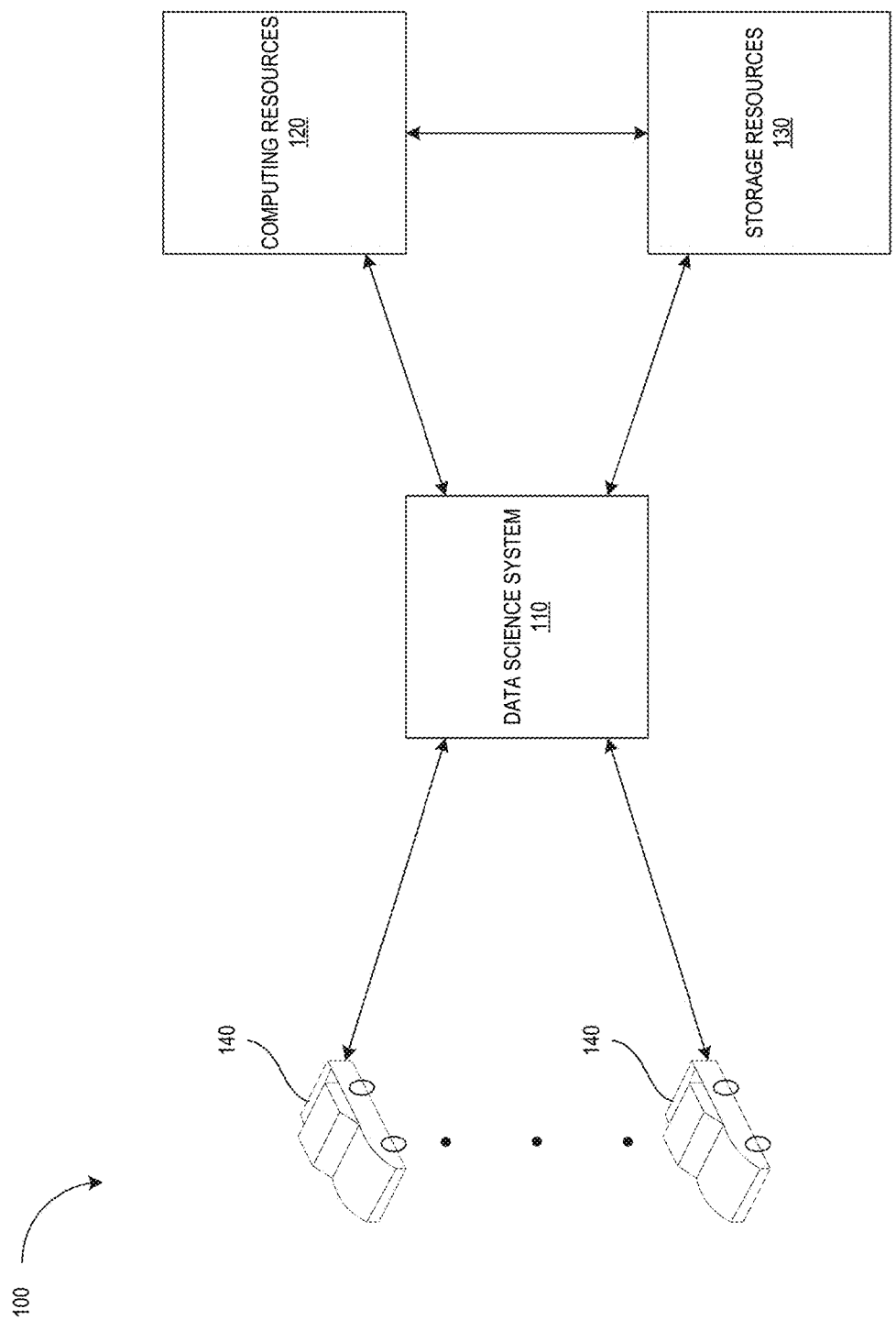
FIG. 1 is a block diagram that illustrates an example system architecture, in accordance with one or more embodiments of the present disclosure.

Developing AV models (e.g., artificial intelligence (AI) models, machine learning (ML) models, etc.) for autonomous functions are an increasingly time-consuming and difficult task. Users (e.g., data scientists and/or data engineers) may perform various functions, tasks, etc., when developing the AV models. The user may also manage the sensor data that is received from various vehicles (e.g., a fleet of vehicles). These tasks are often manually performed which is time consuming. In addition, these tasks are also prone to error because they are manually done (e.g., users may forget a task or perform a task differently).

In addition, multiple tools, applications, services, software, etc., may be used to develop an AV model. These tools, applications, services, software are often disconnected from each other and are often not compatible with each other (e.g., the output of one tool may not be usable as an input to another tool without modifying the output). Using these disparate and disconnected tools, applications, services, software, etc., further increases the time and complexity of developing AV models.

The examples, implementations, and embodiments described herein may help address these issues when training and/or developing AV models. In one embodiment, a data science system provides an end-to-end platform that supports ingesting the data, view/browsing the data, visualizing the data, selecting different sets of data, processing and/or augmenting the data, provisioning of computational and storage resources, and testing AV models. The data science system supports multiple workflows or processes within a single ecosystem/platform which allows users to transition between different phases of the development cycle more easily. The data science system also automates various tasks such as ingesting data, processing data, and/or augmenting data. This may help improve the quality of the AV models that are developed and/or may decrease the amount of time to develop the AV models.

Although the present disclosure may refer to AV models, the examples, implementations, aspects, and/or embodiments described herein may be used with other types of models (e.g., vehicle models, other types of machine learning models, other types of artificial intelligence models, etc.). For example, the data science system may be used to develop, modify, update, etc., a driver assistant model (e.g., a ML/AI model that may assist a driver of a vehicle with the operation of the vehicle). In another example, the data science system may be used to develop, modify, update, etc., semi-autonomous vehicle model (e.g., a ML/AI model that may partially automate one or more functions/operations of a vehicle). One type of AV model is a vehicle guidance model. A vehicle guidance model may be a ML/AI model that is used to guide a vehicle along a route and/or a path. For example, a vehicle guidance model may guide a vehicle on a path along different lanes of a road to avoid obstacles on the road.

FIG. 1 is a block diagram that illustrates an example system architecture 100, in accordance with some embodiments of the present disclosure. The system architecture 100 includes a data science system 110, computing resources 120, storage resources 130, and vehicles 140. One or more network may interconnect the vehicles 140, the data science system 110, the computing resources 120, and/or the storage resources 130. A network may be a public network (e.g., the internet), a private network (e.g., a local area network (LAN) or wide area network (WAN)), or a combination thereof. In one embodiment, network may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g. cell towers), etc. The network may carry communications (e.g., data, message, packets, frames, etc.) between the vehicles 140, the data science system 110, the computing resources 120 and/or the storage resources 130.

The vehicles 140 may be commercial vehicles, test vehicles, and/or may be autonomous vehicles (AVs). In one embodiment, the vehicles 140 may be a fleet of vehicles that are used to collect, capture, gather, compile, etc., sensor data and/or other data that may be used to develop, improve, refine, or enhance AV models. AV models may be ML and/or AI models that may be used to manage and/or control the operation of a vehicle. Each of the vehicles 140 may include various sensors that may generate data (e.g., sensor data) as the respective vehicle operates (e.g., drives, moves around, or is otherwise on). Examples of sensors may include, but are not limited to, tire pressure sensors, steering sensors (e.g., to determine the positions/angles of one or more wheels), a compass, temperature sensors, a global positioning system (GPS) receiver/sensor, a light detection and ranging (LIDAR) device/sensor, an ultrasonic device/sensor, a camera (e.g., a video camera), a radar device/sensor, etc. The sensors of the vehicles 140 may generate sensor data such as video data, image data, GPS data, LIDAR data, time series data, etc. Each of the vehicles 140 by way of its sensors may generate gigabytes (e.g., tens, hundreds, thousands, etc., of gigabytes) of data per hour of operation.

The computing resources 120 may include computing devices which may include hardware such as processing devices (e.g., processors, central processing units (CPUs), processing cores, graphics processing units (GPUS)), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 120 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

The storage resources 130 may include various different types of storage devices, such as hard disk drives (HDDs), solid state drives (SSD), hybrid drives, storage area networks, storage arrays, etc. The storage resources 130 may also include cloud storage resources or platforms which allow for dynamic scaling of storage space.

Although the computing resources 120 and the storage resources 130 are illustrated separate from the data science system 110, one or more of the computing resources 120 and the storage resources 130 may be part of the data science system 110 in other embodiments. For example, the data science system 110 may include both the computing resources 120 and the storage resources 130.

As discussed above, developing AV models (e.g., artificial intelligence (AI) models, machine learning (ML) models, autonomous functions is an increasingly time-consuming and difficult task. Users (e.g., data scientists and/or data engineers) may perform various functions, tasks, etc., when developing the AV models. For example, a user may setup or configure development environments (e.g., computing devices, integrated development/programming environments, and/or software) that may be used to code, create, modify, etc., AV models. In another example, the user may configure the training environment for various AV models. In a further example, a user may perform various pre-processing tasks, such as selecting/finding data, cleaning data (e.g., converting/changing the format of the data), organizing data, etc. The user may also manage the sensor data that is received from the various vehicles 140 (e.g., a fleet of vehicles). These tasks are often manually performed which is time consuming. In addition, these tasks are also prone to error because they are manually done (e.g., users may forget a task or perform do a step different from before).

As AV models become more complex/sophisticated, more and more computing resources and/or storage resources may be used to develop the AV models and/or store the data used by the AV models (e.g., training data). For example, whole clusters or groups of computing devices (e.g., server computers, virtual machines (VMs), containers, etc.) and terabytes, petabytes, etc., of data may be used to train an AV model. In addition, a multiple AV models may be used in a single vehicle 140.

Previously, the development of AV models used various disparate and disconnected tools, applications, services, software, etc. For example, different applications may be used for data configuration management, data collection, feature extraction, data verification, resource management (e.g., storage and/or computing resource management), analysis of data, process management, etc. Using these disparate and disconnected tools, applications, services, software, etc., further increased the time and complexity of developing AV models.

In one embodiment, the data science system 110 may be an application and data-source agnostic system. For example, the data science system 110 may be able to work with a multitude of different applications, services, etc., and may be able to ingest data from various different sources of data (e.g., ingest multiple types/formats of data from multiple types and/or brands of sensors). The data science system 110 may provide a cloud-based infrastructure (e.g., computing resources 120 and/or storage resources 130) that may be tailored/customized for the development of AV models (e.g., ML models, statistical models, rule-based models, etc.). The data science system 110 may support the various workflows, processes, operations, actions, tasks, etc., in the development cycle for AV models. The development cycle for an AV model may be referred to as a loop, a development loop, a big loop, a development process, etc. The development cycle may include the ingestion of data from the vehicles 140. The data may be selected, processed, cleaned, analyzed, annotated, visualized (e.g., viewed), as discussed in more detail below. Computational resources 120 and storage resources 130 may be allocated to develop AV models using the data and/or to store modifications to the data. The AV models may be deployed in the vehicles for testing (e.g., using shadow mode as discussed in more detail below) and additional data may be collected. Other models (e.g., driver assistant models, semi-autonomous vehicle guidance models, etc., may also be deployed in the vehicles for testing (e.g., a driver assistant model may also be run in shadow mode). The additional data may be ingested by the data science system 110 and may be used to develop further AV models or update/improve existing AV models, restarting the development cycle.

In one embodiment, data (e.g., sensor data such as CAN data, images, videos, GPS data, LIDAR data, speed, acceleration, etc.) may be received, collected, ingested, etc., from vehicles 140 (e.g., a fleet of vehicles). The data may be processed, cleaned, formatted, scrubbed, massaged, for further feature labelling, annotation, extraction, manipulation, and/or processing. Users (e.g., data scientists and/or data engineers) may be use the data science system 110 to explore the data (e.g., using a data explorer or data visualizer to search for certain types of data, metadata, annotations, etc.) and to create, test, update, and/or modify various AV models.

In one embodiment, the data science system 110 may allow users the flexibility to use and/or modify the data as needed. For example, a user may modify a copy of a set of sensor data and may use the modified set of sensor data to train one or more AV models. The trained (e.g., resulting AV model) and/or the modified set of sensor data may be stored using a version control system so that the AV model and/or the data (e.g., the modified or processed data) used to train the AV model may be used or verified at a later time (e.g., to reproduce the training of the AV model).

In one embodiment, the data science system 110 may enable end-to-end development and/or testing of AV models and/or other AV functions. The data science system 110 may streamline, simplify, and/or automate (e.g., fully automate or at least partially automate) various tasks related to the development and/or testing of AV models. For example, the data science system 110 may streamline and/or automate data ingestion, data preparation, data exploration and visualization, model development, testing, training, and deployment. The data science system 110 may allow for a faster and/or more efficient development cycle (e.g., AV model or application development cycle), as discussed in more detail below. The data science system 110 may also allow AV models (e.g., AV models that have been updated, modified, etc.) to be tested in the vehicles 140 safely (e.g., shadow mode, as discuss in more detail below). This allows the data science system 110 to test new AV models using real/live data from vehicles 140 without affecting the operation of the vehicles 140 (e.g., without endangering passengers).

In one embodiment, the data science system 110 may manage the data ingestion and data storage for the data (e.g., sensor data such as LIDAR data, images, videos, CAN data, log files, traces, etc.) generated by the vehicles 140. The data science system 110 may prepare and/or pre-process the data (e.g., sensor data) that is received from the vehicles 140. For example, the data science system 110 may format the data (e.g., convert the data from one format to another). In another example, the data science system 110 may clean the data (e.g., may remove portions of the data that are not used, may convert units of measurement, etc.). The data may be prepared and/or pre-processed when the data is ingested or received by the data science system 110. In addition, a modified version of the data may also be generated when the data is ingested to allow for playback and/or viewing of the data, as discussed in more detail below. Preparing/pro-processing the data and/or generating the modified data (for playback/viewing) at ingestion may allow a multitude of users and/or AV models to leverage the time and computational resources used to prepare/pre-process the data. The original data (e.g., raw data) that was received from the vehicles 140 is also stored to maintain the original data.

In one embodiment, the data science system 110 may manage the allocation and/or use of computing resources 120 (e.g., computing clusters, server computers, VMs, containers, etc.). The computing resources 120 may be used for data transformation, feature extraction, development and testing of AV models, etc. The computing resources 120 may use various cloud service platforms (e.g., cloud computing resources).

In one embodiment, the data science system 110 may also manage the allocation and/or use of storage resources 130. The storage resources 130 may store different versions of data (e.g., different versions of sensor data) and/or different version of AV models. The different versions of data may be used to train the different versions of AV models. The data science system 110 may maintain and manage the different versions of AV models and the different versions of data used to train the AV models. This may allow a user to develop a new AV model using a previous version of data (e.g., a previous set of training data) and may allow a user to track the development of the AV model and reproduce the development/testing of the AV model.

In one embodiment, the data science system 110 may also allow a user to explore, visualize, and/or view sensor data.

The data science system 110 may provide a user interface (e.g., a graphical user interface) which allows a user to stream, playback, and/or view multiple streams of sensor data simultaneously. For example, the user interface may allow a user to view videos from multiple cameras (e.g., streams of video data), view LIDAR data from one or more LIDAR sensors (e.g., streams of LIDAR data), the location of a vehicle 140 (e.g., streams of GPS data or a map) and view the speed/acceleration of the vehicle 140 (e.g., a stream of odometer data). The data science system 110 may generate the sensor data by downsampling without removing outliers or corner cases in the downsampled sensor data. This allows the data science system 110 to generate a smaller data stream to allow users to playback the data, but still allow users to see when outliers, variations, or corner cases occur in the downsampled sensor data. The data science system 110 may allow the user to zoom in or zoom out on a particular stream of data (e.g., view more samples of data per second in a stream of time series data), fast-forward or rewind a data stream, and download frames or images from specific cameras etc. The different streams of sensor data may be synchronized in time to allow the user to comprehensively visualize the state and/or operation of a vehicle 140 at different points in time.

The data science system 110 may also allow users to update, modify, improve, augment, enhance, etc., the data (e.g., sensor data) received from the vehicles 140. For example, the data science system 110 may allow users to add metadata (e.g., labels, descriptions, annotations, tags, identifiers, text, and/or other information) to the data received from the vehicle 140. In one embodiment, the data science system 110 may analyze the data to create and/or add the metadata (e.g., may automatically analyze video data to identify objects, such as trees, in the video data). In another embodiment, the data science system 110 may a third part service, application, process, etc., for generating metadata. The metadata may be time based metadata. For example, the metadata may be associated with a portion of a time period in a stream of data (e.g., in a ten second portion of video data, time series data).

In one embodiment, the data science system 110 may deploy an AV model to vehicles 140 to test the AV model (e.g., to perform experiments using the AV model). The AV model that is deployed for testing may be referred to as a test AV model. The test AV model may be a newer, updated, modified version of an existing AV model. The existing AV model may be an AV model that is currently approved for use in the vehicles 140 (e.g., an AV model that has already been test and approved). The existing AV model may be referred to as a production AV model. The test AV model may operate in parallel with the existing AV model on a vehicle 140, however, the test AV model may not be able to control and/or influence the operation of the vehicle 140. This may be referred to as running the test AV model in shadow mode, allowing the test AV model to shadow the production AV model, etc. This may allow the test AV model to receive live data (e.g., live sensor data as the vehicle 140 moves through an environment) and generate predictions, inferences, decisions, etc., based on the live data.

When a test AV model is operation in shadow mode, the vehicle 140 (e.g., a computing device, a processing device, etc., on the vehicle 140) may monitor the output of the test AV model (e.g., the decisions, inferences, predictions, actions, etc., generated by the test AV model). The vehicle 140 may determine whether the output of the test AV model deviates from a reference output (e.g., a reference decision, inference, prediction, action, etc.). For example, the vehicle 140 may determine whether the output of the test AV model deviates from a reference output by more than a threshold. If the output of the test AV model deviates from the reference output by more than the threshold, the vehicle 140 may save the sensor for a period of time before and after the deviation occurred (e.g., for thirty seconds before and thirty seconds after the deviation occurred).

In one embodiment, the vehicle 140 may use the behavior, actions, etc., of a driver of the vehicle 140 to determine whether the output of the test AV model deviates from reference (e.g., the driver of the vehicle 140 is the reference). For example, if the test AV model determines that the vehicle 140 should turn left by ten degrees and the user turns the vehicle 140 to the left by thirty degrees, the vehicle 140 may determine that the test AV model (e.g., the output of the test AV model) has deviated from the user (e.g., the reference). In another embodiment, the vehicle 140 may use the output of the production AV model to determine whether the output of the test AV model deviates from reference (e.g., the production AV model is the reference).

In one embodiment, users (e.g., data scientists/engineers) may analyze the outputs/results of AV models and/or the data ingested by the data storage system 110. The users may determine that certain types, categories, classes, etc., of data are needed for the development and/or improvement of one or more AV models. For example, the user may determine that additional videos of driving through snowy weather are needed to refine or improve an AV model. The user may provide a request to the data science system 110 for the additional videos of driving through snowy weather. The data science system 110 may forward the request to the vehicles 140. The drivers of the vehicle 140 may collect the requested videos the videos may be provided to the data science system 110. The data science system 110 may ingest, process, and enhance the data, as discussed above. After the new videos have been ingested, the user may be notified that the requested videos (e.g., new or additional sensor data) are now available for use (e.g., viewing, selection, augmentation, etc.). The user can re-train their AV model and/or perform additional experiments using the AV model and the requested videos.

As discussed above, the data science system 110 provides various functions, operations, capabilities, etc., that may be useful during the development of AV models. The data science system 110 provides an end-to-end platform for the development of AV models, starting from data ingestion all the way through testing. The data science system 110 also provides for storage and visualization of heterogeneous data (e.g., different types of sensor data). The data science system 110 allows users to organize, transform, and augment sensor data. The data science system 110 also allows users to save different versions of data so that the testing and development of the AV models can be tracked or correlated with the different version of data (e.g., which versions of data were used to train and/or test which versions of AV models). The data science system 110 also allows users to provision computational and storage resources that include custom-integrated development environments, software or tools. The single data science system 110 may streamline the development process/cycle for AV models by automating various tasks (e.g., processing or augmenting data) and seamlessly integrating the different tools, services, processes that are used at different parts of the development cycle.

Figure 2:
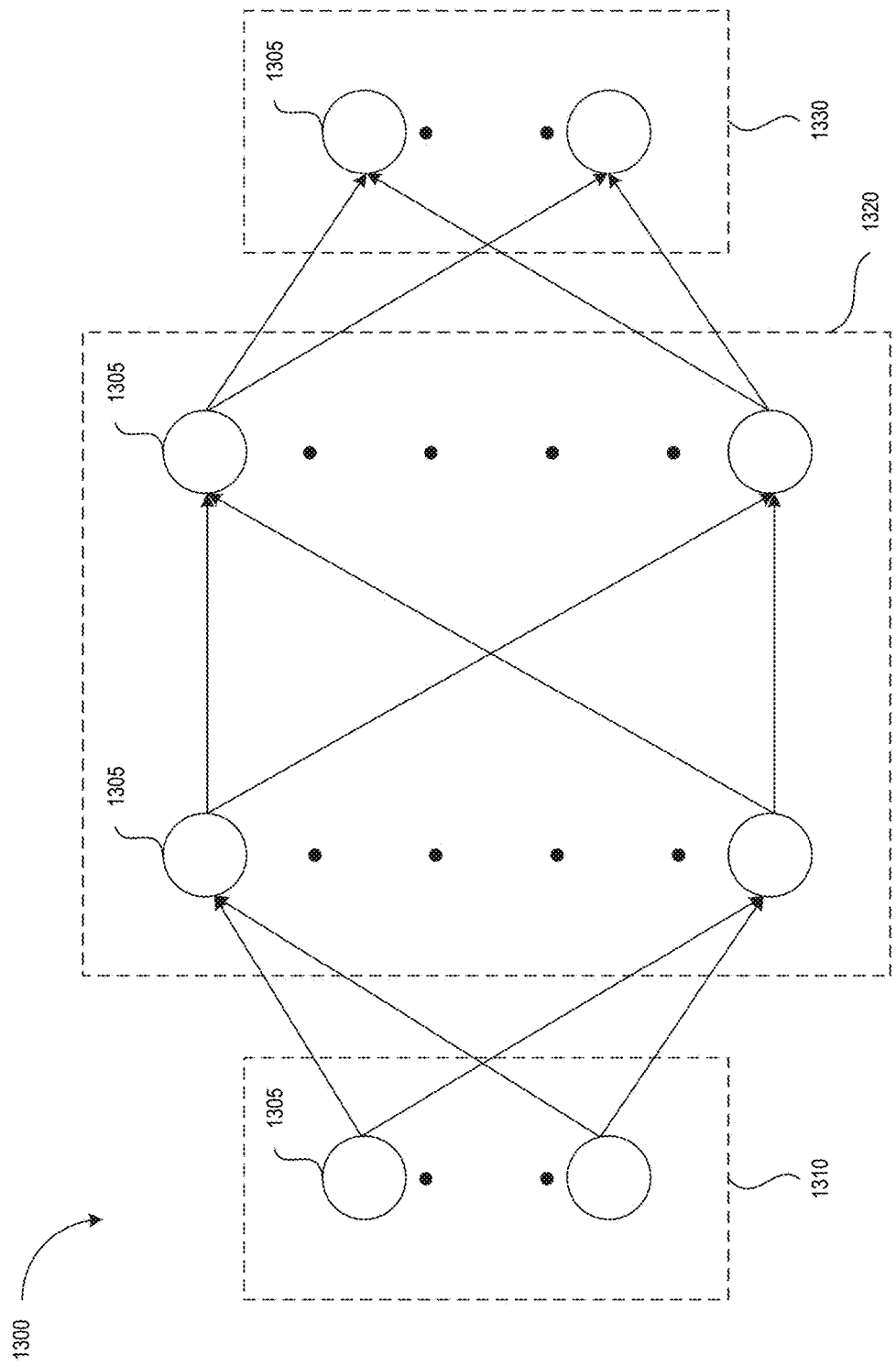
FIG. 2 is a diagram illustrating an example neural network, in accordance with one or more embodiments of the present disclosure.

FIG. 2 is a diagram illustrating an example neural network 1300, in accordance with one or more embodiments of the present disclosure. The neural network 1300 may be an example of a machine learning model (e.g., a vehicle guidance model, an autonomous vehicle mode, a driver assistant model, etc.). The neural network 1300 may be used to model relationships between (e.g., complex) inputs and outputs or to find patterns in data, where the dependency between the inputs and the outputs may not be easily ascertained. The neural network 1300 may also be a computing model that may be used to determine a feature in input data through various computations. For example, the neural network 1300 may determine a feature (e.g., a number, shape, pattern, etc.) in input data (e.g., audio data, image data, video data, etc.) according to a structure that defines a sequence of computations to be performed. The neural network 1300 may also generate an output (e.g., an inference, a decision, etc.) based on the input data. For example, the neural network 1300 may generate/determine a bounding box around an object in an image/video, or may generate/determine a path/trajectory for a vehicle.

The neural network 1300 may be a convolutional neural network (CNN). A CNN may be a feed forward neural network where the connections between the nodes do not form a cycle (e.g., connections do not go backwards). The signals, messages, data, information etc., may not go backwards through the neural network (e.g., may not go from right to left). The neural network 1300 includes an input layer 1310, a hidden layer 1320, and an output layer 130. Each of the input layer 1310, the hidden layer 1320, and the output layer 130 includes one or more nodes 1305. Each of the input layer 1310, the hidden layer 1320, and the output layer 130 may have a different number of nodes 1305. The neural network 1300 may be a deep neural network or a deep CNN. A neural network may be deep if the hidden layer 1320 includes multiple levels (e.g., multiple sub-layers of nodes 1305). Each of the nodes 1305 in a layer is connected to another node 1305 in the neural network 1300.

Each connection may be associated with a weight or weight value (e.g., may have a weight). A weight or weight value may define coefficients applied to the computations. For example, the weights or weight values may be scaling factors between two or more nodes 1305. Each node 1305 may represent a summation of its inputs, and the weight or weight value associated with a connection may represent a coefficient or a scaling factor multiplied to an output of a node 1305 in that connection. The weights between the nodes 1305 may be determined, calculated, generated, assigned, learned, etc., during a training process for the neural network. Thus, the weights of the hidden layers can be considered as an encoding of meaningful patterns in the data. The weights of the connections between the nodes 1305 may be modified by additional training.

Although neural network 1300 is depicted with a particular number of nodes 1305, layers, and connections, various neural network architectures/configurations may be used in other embodiments. For example, different fully connected neural networks and partially connected neural networks (e.g., where all nodes in adjacent layers are not connected) may be used. In addition, some layer may be fully connected (e.g., output layer 1330 may be a fully connected layer that includes multiple layers of nodes and the layers of nodes may be fully connected). Furthermore, other types of neural networks may also be used. For example, a recurrent neural network (RNN) may be used. A RNN may be a neural network that allows connections between nodes to form a cycle and/or may go in a backwards direction.

Figure 3A:
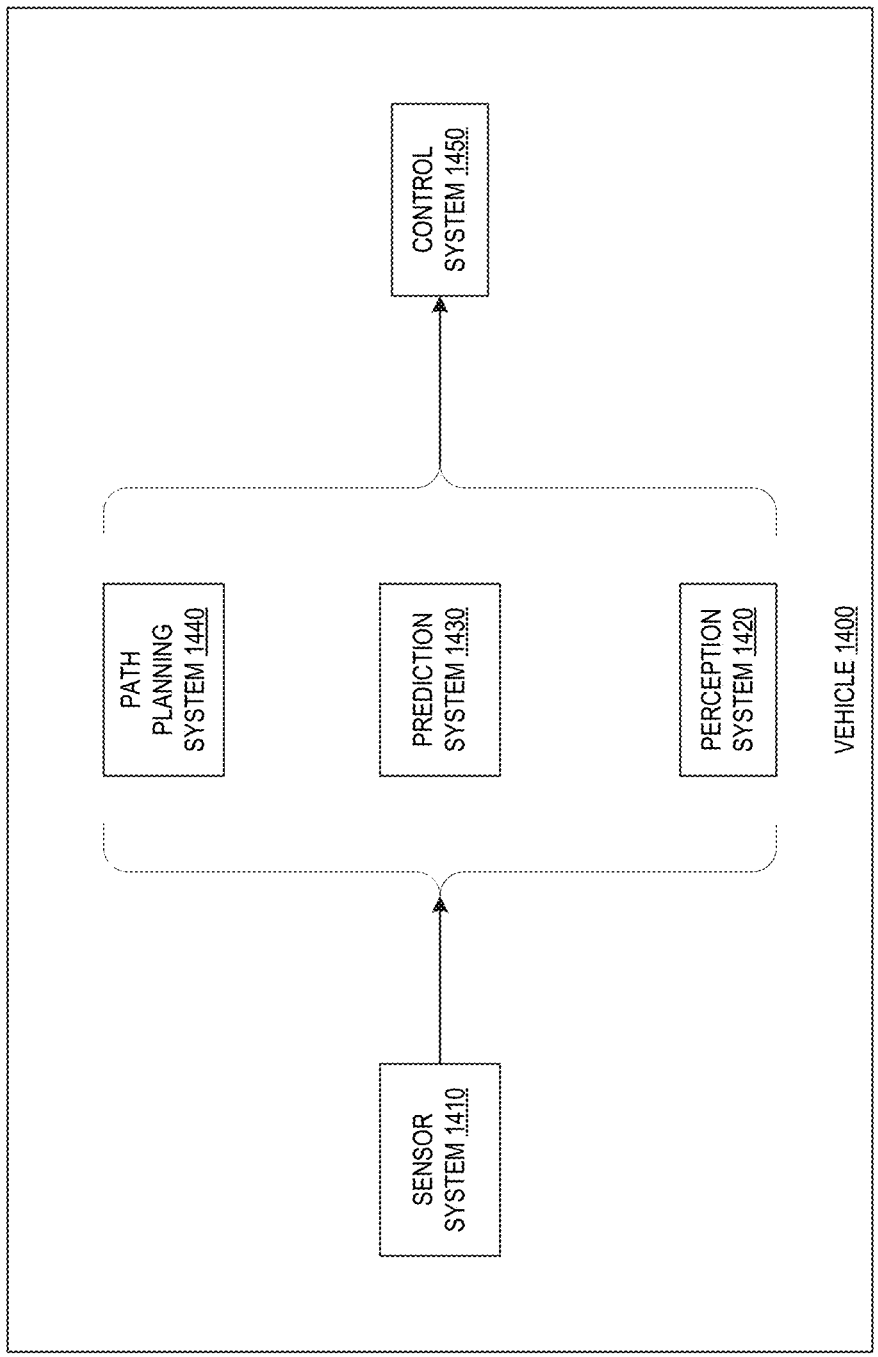
FIG. 3A is a block diagram that illustrates an example vehicle, in accordance with one or more embodiments of the present disclosure.

FIG. 3A is a block diagram that illustrates an example vehicle 1400, in accordance with one or more embodiments of the present disclosure. In one embodiment, the vehicle 1400 may be an autonomous vehicle (e.g., a self-driving vehicle). For example, the vehicle 1400 may be a vehicle (e.g., car, truck, van, mini-van, semi-truck, taxi, drone, etc.) that may be capable of operating autonomously without intervention from and/or interaction with a user (e.g., an operator of the vehicle 1400, a driver of the vehicle 1400, etc.). In another embodiment, the vehicle 1400 may also be a vehicle with autonomous capabilities. A vehicle 1400 vehicle with autonomous capabilities may be a vehicle that may be capable of performing some operations, actions, functions, etc., autonomously. For example, vehicle 1400 may have adaptive cruise control capabilities and/or lane assist/keep capabilities. A vehicle 1400 with autonomous capabilities may be referred to as a semi-autonomous vehicle. The vehicle 1400 may include various systems that allow the vehicle 1400 to operate autonomously and/or semi-autonomously. For example, vehicle 1400 includes a sensor system 1410, a perception system 1420, a prediction system 1430, a path planning system 1440, a control system 1450, and a data collection module 1460.

The sensor system 1410 may include one or more sensors (e.g., detectors, sensing elements, sensor devices, etc.). The one or more sensors may provide information about the operation of the vehicle 1400, information about the condition of the vehicle 1400, information about occupants/users of the vehicle 1400, and/or information about the environment (e.g., a geographical area) where the vehicle 1400 is located. The one or more sensors may be coupled to various types of communication interfaces (e.g., wired interfaces, wireless interfaces, etc.) to provide sensor data to other systems of the vehicle 1400. For example, a sensor may be coupled to a storage device (e.g., a memory, a cache, a buffer, a disk drive, flash memory, etc.) and/or a computing device (e.g., a processor, an ASIC, an FPGA, etc.) via a control area network (CAN) bus. In another example, a sensor may be coupled to a storage drive and/or a computing device via Bluetooth, Wi-Fi, etc. Examples of sensors may include a camera, a radar sensor, a LIDAR sensor, etc.

The perception system 1420 may include hardware, software, firmware, or a combination thereof that may process, analyze, and/or interpret the sensor data generated by the sensors of the sensor system 1410. The perception system 1420 may include one or more vehicle guidance models (e.g., machine learning models, neural networks, etc.) that may detect objects and/or conditions of the environment where the vehicle 1400 is located. For example, the one or more vehicle guidance models may detect pedestrians, other vehicles (e.g., other cars, trucks motorcycles), traffic signs, weather conditions (e.g., rain, snow, etc.), driving conditions (e.g., time of day, type of road such as dirt, asphalt, concrete, etc.). The one or more vehicle guidance models of the perception system 1420 may generate output that may indicate the objects and/or conditions of the environment that are detected/identified by the one or more vehicle guidance models. This output may be provided to the prediction system 1430 and/or the data collection module 1460.

The prediction system 1430 may include hardware, software, firmware, or a combination thereof that may process, analyze, and/or interpret the sensor data generated by the sensors of the sensor system 1410 and/or the outputs of the perception system 1420 (e.g., the objects and/or conditions detected by the perception system 1420). The prediction system 1430 may determine an estimated and/or predicted behavior or path for various objects in the environment where the vehicle 1400 is located. For example, based on the sensor data and/or the outputs of the perception system 1420, the prediction system 1430 may estimate, predicate, calculate, determined, etc., a path for another vehicle that is located on the same road as the vehicle 1400. In another example, the prediction system 1430 may detect the path for a pedestrian walking in the environment where the vehicle 1400 is located. One or more vehicle guidance models of the prediction system 1430 may generate output that may indicate the estimated and/or predicted behavior/path of the objects. This output may be provided to the path planning system 1440 and/or the data collection module 1460.

The path planning system 1440 may include hardware, software, firmware, or a combination thereof that may process, analyze, and/or interpret the sensor data generated by the sensors of the sensor system 1410 and/or the outputs of the prediction system 1430 (e.g., the predicted paths/behaviors). The path planning system 1440 may determine a path through the environment where the vehicle 1400 is located/travelling based on the objects detected and the predicted path/behavior of the objects. For example, the path planning system 1440 may generate a path along a road that avoids one or more obstacles (e.g., other vehicles) on the road. One or more vehicle guidance models of the path planning system 1440 may generate output indicating the path for the vehicle 1400 through the environment. This output may be provided to the control system 1450 and/or the data collection module 1460.

The control system 1450 may include hardware, software, firmware, or a combination thereof that may control the functions, operations, actions, etc., of the vehicle 1400. For example, the control system 1450 may be able to control a braking system and/or an engine to control the speed and/or acceleration of the vehicle 1400. In another example, the control system 1450 may be able to control a steering system to turn the vehicle 1400 left or right. In a further example, the control system 1450 may be able to control the headlights or an all-wheel drive (AWD) system of the vehicle 1400 based on weather/driving conditions (e.g., if the environment has snow/rain, if it is night time in the environment, etc.). The control system 1450 may use sensor data and/or outputs generated by vehicle guidance models of one or more of the path planning system 1440, the prediction system 1430 and the perception system 1420 to control the vehicle 1400.

Figure 3B:
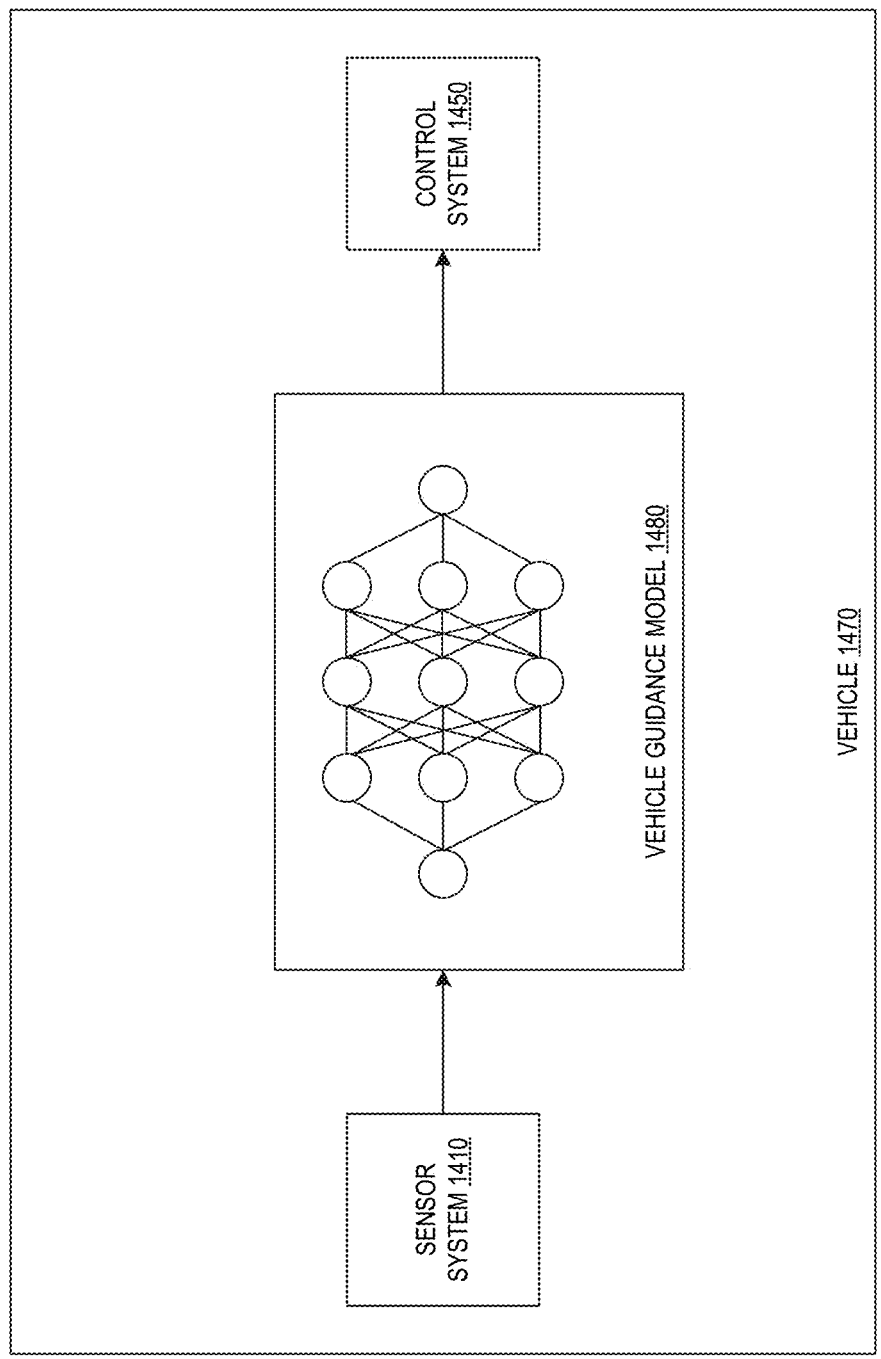
FIG. 3B is a block diagram that illustrates an example vehicle, in accordance with one or more embodiments of the present disclosure.

FIG. 3B is a block diagram that illustrates an example vehicle 1470, in accordance with one or more embodiments of the present disclosure. In one embodiment, the vehicle 1470 may be an autonomous vehicle (e.g., a self-driving vehicle). In another embodiment, the vehicle 1470 may also be a vehicle with autonomous capabilities (e.g., a vehicle that may be capable of performing some operations, actions, functions, etc., autonomously). The vehicle 1470 may include various systems that allow the vehicle 1470 to operate autonomously and/or semi-autonomously. For example, vehicle 1470 includes a sensor system 1410, a control system 1450, and a vehicle guidance model 1480.

The sensor system 1410 may include one or more sensors (e.g., detectors, sensing elements, sensor devices, etc.). The one or more sensors may provide information about the operation of the vehicle 1470, information about the condition of the vehicle 1470, information about occupants/users of the vehicle 1470, and/or information about the environment (e.g., a geographical area) where the vehicle 1470 is located. The one or more sensors may be coupled to various types of communication interfaces (e.g., wired interfaces, wireless interfaces, etc.) to provide sensor data to other systems of the vehicle 1470.

The control system 1450 may include hardware, software, firmware, or a combination thereof that may control the functions, operations, actions, etc., of the vehicle 1470. The control system 1450 may use outputs generated by vehicle guidance model 1480 to control the vehicle. For example, the vehicle guidance model 1480 may generate one or more steering commands. The steering command may indicate the direction that a vehicle 1470 should be turned (e.g., left, right, etc.) and may indicate the angle of the turn. In another example, the steering commands may include data indicating coordinates, locations, positions, etc., of the next few waypoints (e.g., the next two, ten, or some other appropriate number of waypoints) for the vehicle 1470. The waypoints may be part of the path for the vehicle 1470. A steering command may be data and/or information that is used to move and/or control the path of the vehicle. A steering command may also be referred to as steering data. The control system 1450 may actuate one or more mechanisms/systems (e.g., a steering system, a steering wheel, etc.) to turn the vehicle 1470 (e.g., to control the vehicle 1470) based on the steering command. For example, the control system 1450 may turn the steering wheel by a certain number of degrees to steer the vehicle 1470.

Rather than using a separate system (e.g., perception system 1420) to perceive (e.g., detect, sense, etc.) the environment where vehicle 1470 is located, a separate system (e.g., prediction system 1430) to predict (e.g., estimate) the behavior/path of objects in the environment, and a separate system (e.g., path planning system 1440) to determine/generate a path for the vehicle 1470 through the environment, the vehicle 1470 may use a single vehicle guidance model 1480 to guide the operations, functions, and/or actions of the vehicle 1470. The vehicle guidance model 1480 may receive raw sensor data (e.g., images, video, radar data, LIDAR data, etc.) as input and may generate steering commands (e.g., one or more commands, instructions, etc.) to steer the vehicle through an environment depicted by the sensor data. Thus, the vehicle guidance model 1480 may perform the perception, prediction, and planning tasks/operations that are performed by separate systems in the vehicle 1400 illustrated in FIG. 3A. The vehicle guidance model 1480 may be referred to as an end-to-end neural network or a deep driving neural network.

Figure 4:
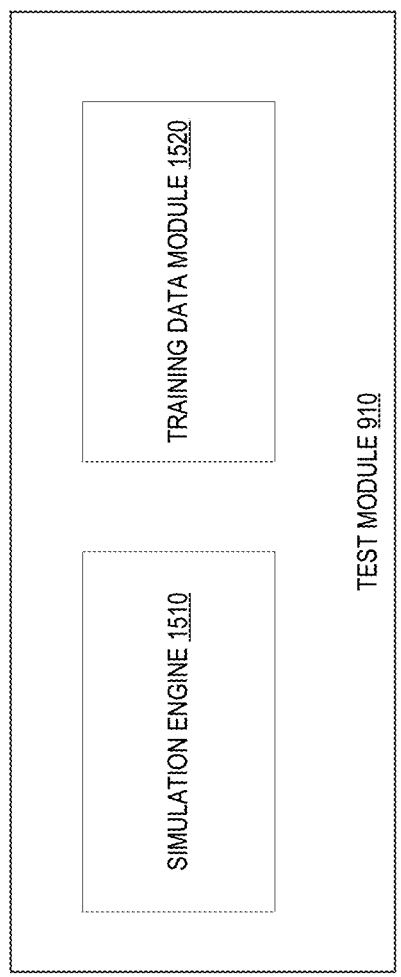
FIG. 4 is a block diagram that illustrates an example test module, in accordance with one or more embodiments of the present disclosure.

FIG. 4 is a block diagram that illustrates an example test module 910, in accordance with one or more embodiments of the present disclosure. The test module 910 includes a simulation engine 1510 and a training data module 1520. Some or all of the modules, components, etc., illustrated in FIG. 4 may be implemented in software, hardware, firmware, or a combination thereof. Although the simulation engine 1510 is illustrated as part of the test module 910, the simulation engine 1510 may be separate from the test module 910 in other embodiments.

In one embodiment, the test module 910 may be part of a data science system (e.g., data science system 110 illustrated in FIG. 1). As discussed above, the data science system may allow users to develop (e.g., code), refine, modify, and/or test vehicle guidance models (e.g., driver assistance models, AV models, neural networks, etc.). For example, the data science system may include computing devices, virtual machines, integrated development environments (IDEs), libraries, applications, etc., that allow users (e.g., engineers, coders, data scientists, etc.) to create, code, develop, generate, etc., various vehicle guidance models (e.g., to create neural networks). In other embodiments, the test module 910 may be separate from a data science system. For example, the test module 910 may be a separate set of computing devices and/or computing resources that are used to generate training data and/or test vehicle guidance models.

The test module 910 may allow users to test and/or train vehicle guidance models using training or test data. For example, the test module 910 may allow users to execute vehicle guidance models using training data. The test module 910 may provide the training data as input to the vehicle guidance models. The test module 910 may also receive or collect the output (e.g., the output data, results, inferences, etc.) generated by the vehicle guidance models. The test module 910 includes a simulation engine 1510 and a training data module 1520. The test module 910 may also include computational and/or storage resources.

As discussed above, one type of vehicle guidance model may be an end-to-end neural network. The end-to-end neural network may use images (or video) as input and may generate one or more steering commands based on the image. The end-to-end neural network may also be referred to as a deep driving neural network. In one embodiment, the development module 905 may be used to create an end-to-end neural network and the test module 910 may be used to train and/or test the neural network.

In one embodiment, the simulation engine 1510 may include hardware, software, firmware, or a combination thereof that allows users to create simulated environments. The simulation engine 1510 may also be referred to as a game engine. A simulated environment may be a virtual construct, similar to a video game, computer game, etc. The simulated environment may enforce various rules, such as the laws of physics. The simulated environment may allow simulated objects to move and/or interact with each other in the simulated environment. A simulated environment may also be referred to as a virtual environment.

In one embodiment, the training data module 1520 may generate a first simulated environment using the simulation engine 1510. For example, the training data module 1520 may provide data (e.g., input, commands, messages, etc.) to the simulation engine 1510. The data may instruct the simulation engine 1510 to create different simulated environments and/or objects, as discussed in more detail below. The first simulated environment may be generated based on a real world environment. For example, the first simulated environment may be generated based on map data, images, video, etc., of a physical location (e.g., a parking lot, a freeway, neighborhood in a city, etc.). The first simulated environment may also be generated without using information (e.g., data, images, video, etc.) of a physical location. For example, the first simulated environment may not be based on a physical location.

In one embodiment, the first simulated environment includes a route. The route may be an area, region, portion, etc., in the simulated environment where vehicles are allowed to travel or move. The route may also include a map, layout, etc., of the simulated environment which indicates where vehicles are allowed to move/travel. For example, the route may include a road, a street, a freeway, a highway, a lane, a path, or a combination thereof. The route may be for a simulated vehicle (e.g., a virtual vehicle) that may travel through the first simulated environment (or other simulated environments) along the route. In some embodiments, the route may be determined or identified non-deterministically (e.g., randomly). For example, the curvature of different portions of a route, the angle may be selected or determined by the training data module 1520 non-deterministically (e.g., training data module 1520 may randomly select an angle). The length of different portions of the route (e.g., different segments) may be determined by the by the training data module 1520 non-deterministically (e.g., the training data module 1520 may randomly select a length for a straight portion of the route). In other embodiments, the route may be determined or identified base on map data or an existing physical environment. For example, the route may be based on a set of physical streets or roads. In another example, the route may be based on map data (e.g., GPS data). In further embodiments, the route may further be determined or identified based on user input. For example, a user may provide user input to the training data module 1520 (via a graphical user interface, a command line interface, etc.) indicating the route in the first simulated environment.

In one embodiment, the training data module 1520 may determine a set of locations for a set of objects (e.g., one or more objects) within the first simulated environment (e.g., a location for each object). The objects may be referred to as simulated objects, virtual objects, etc. The objects may be abstract/unrealistic objects (e.g., objects that do not correspond to or look similar to physical objects in the real world). The locations for the set of objects may be determined, identified, etc., non-deterministically (e.g., randomly). For example, the training data module 1520 may randomly select locations (e.g., points, positions, etc.) within the first virtual environment where the objects should be located. The abstract/unrealistic objects may represent obstacles, traffic control devices (e.g., signs, stoplights, dividers, barriers, etc.), vehicles, pedestrians, etc., with the first virtual environment. In other embodiments, the locations of the objects may also be determined or identified based on user input. For example, a user may indicate an area, locations, etc., where an object should be located.

In one embodiment, the set of objects may be generated, created, etc., non-deterministically (e.g., randomly). For example, the size (e.g., height, width, length, etc.) of each object may be randomly selected by the training data module 1520. In another example, the shape of each object may be selected non-deterministically. The training data module 1520 may randomly select a cone, cube, sphere, cylinder, a geometric shape, an irregular shape, or some other shape for each object. In a further example, the orientation of each object may be randomly selected by the training data module 1520. For example, an object may be oriented such that the object is laying on a particular face, edge, and/or point of the object. In another example, the texture (or textures) of the object (e.g., the surface of the object) may be selected randomly. For example, the object may have a smooth texture, a spiky texture, a matte texture, a fuzzy texture, etc.

In one embodiment, the set of objects may include unrealistic objects and may also include realistic objects. For example, the set of objects may include unrealistic objects. The set of objects may include objects that do not correspond to or are not based on physical/real objects (e.g., objects with abstract or irregular shapes). In another example, the set of objects may additionally include realistic objects that are visually similar to a physical/real object. The realistic objects may be generated based on images, pictures, video, etc., of a physical/real object.

In one embodiment, the training data module 1520 may determine a path for the simulated vehicle based on the route and the set of locations of the set of objects. For example, the training data module 1520 may determine a path that travels, moves, goes, etc., along the route through the first simulated environment. The path may avoid objects that are located along and/or near the route in the first virtual environment. For example, the route may be a road in the first virtual environment and the path may avoid objects that are located on the road. In some embodiment, the training data module 1520 may use various algorithms, functions, techniques, methods, etc., to automatically determine the path based on the route and the locations of the objects. For example, the training data module 1520 may generate a path without user input (e.g., automatically). This may allow the training data module 1520 to generate a more optimal, more efficient, and/or smoother path. In other embodiments, the training data module 1520 may determine a path based on user input. For example, a user may provide user input to the training data module 1520 and/or the simulation engine 1510 to indicate the path (e.g., the user may drive or move along the route to indicate the path).

In one embodiment, the training data module 1520 may generate a set of simulated environments (e.g., other simulated environments, additional simulated environments, etc.) using the simulation engine 1510. The set of simulated environments may be based on the first simulated environment and the set of locations. For example, the training data module 1520 may use the same route and locations of objects that were used in the first simulated environment. The routes and/or the locations of the objects in the set of simulated environments may be the same as the route and/or locations of objects in the first simulated environment. The training data module 1520 may also reuse other portions, components, etc., of the first simulated environment (e.g., the same elevation or height of different portions of the first simulated environment, the same weather conditions, the same road type, etc.) in the set of simulated environment.

In one embodiment, each additional simulated environment (e.g., each of the set of simulated environments) may include its own set of non-deterministically generated objects. For example, the training data module 1520 may cause the simulation engine 1510 to generate an additional simulated environment and may cause the simulation engine 1510 to randomly vary the size, shape, orientation, text, etc., of the objects. For example, instead of using a sphere at a particular location, the training data module 1520 may use a cylinder. The objects may be located at the same locations as the objects in the first simulated environment, as discussed above.

In one embodiment, each additional simulated environment (e.g., each of the set of simulated environments) may include one or more non-deterministically selected weather conditions. For example, the training data module 1520 may randomly select rain, snow, sleet, hail, wind, clouds, etc., for each simulated environment. The locations, amount, and/or duration of the weather conditions may also be randomly selected. In another embodiment, each additional simulated environment (e.g., each of the set of simulated environments) may include one or more non-deterministically selected light conditions. For example, each simulated environment may include randomly selected sources of light, random locations for the sources of light, random glare, random reflections, etc.

In one embodiment, the training data module 1520 may generate a set of images based on the set of simulated environments, the path, and/or the non-deterministically generated objects within the set of simulated environments. For example, the training data module 1520 may use the simulation engine 1510 to drive, move, etc., a simulated vehicle (e.g., a virtual vehicle or other virtual/simulated object) through each simulated environment of the set of simulated environments. The simulated vehicle may drive/move along the path that was determined by the training data module 1520. As the simulated vehicle drives/moves along the path, the simulation engine 1510 may provide a view of the simulated environment from the perspective of the simulated vehicle. This may be similar to a first person view of an environment or location within a game, a video game, a computer game, etc. The training data module 1520 may capture, store, save, etc., the views of the simulated environment as the simulated vehicle drives/moves along the path. The training data module 1520 may store the views of the simulated environments as images, pictures, a digital video, etc. The training data module 1520 may capture, record, etc., the views/images at different rates. For example, the training data module 1520 may capture, record, etc., thirty views/images per second, sixty views/images per second, or some other appropriate number of views/images per second. The images/views may be stored and used as training data for training various vehicle guidance models (e.g. machine learning models, vehicle guidance models, end-to-end neural networks, etc.).

As discussed above, the views of the simulated environment may be from the perspective of the simulated vehicle. In one embodiment, the views of the simulated environment may correspond to the location of a sensor within a vehicle that corresponds to or is associated with the simulated vehicle. For example, the simulated vehicle may represent a particular make and/or model of a real/physical vehicle. The real/physical vehicle may have a camera (e.g., a sensor) located at a particular location on the real/physical vehicle (e.g., located above the rear view mirror, located on a trunk, located on a front grill, etc.). The perspective of the views may correspond to the location of the camera. For example, the perspective of the views may be the same as perspective of the views (e.g., images) that would be generated by the camera of real/physical vehicle if the real/physical vehicle had traveled along path. This allows the vehicle guidance model (e.g., the end-to-end neural network) to be configured, adapted, customized, etc., for different makes and/or models of vehicles which may have sensors (e.g., cameras) at different locations. In one embodiment, the view of the simulated environment may be adjusted, calibrated, etc., based on the location of a sensor (e.g., a camera) on a real/physical vehicle. For example, the positioned and/or orientation of the view may be calibrated/adjusted such that the perspective of the view matches the perspective of the views (e.g., images) that would be generated by the camera of real/physical vehicle if the real/physical vehicle had traveled along path. The view may also be calibrated/adjusted based on characteristics, properties, parameters, of the camera of the real/physical vehicle. For example, parameters such as focal length, frame rate, exposure times, resolution, etc., may also be calibrated/adjusted.

In one embodiment, one or more of the objects in the simulated environments may move (e.g., an object may be a moving object). For example, the training data module 1520 may identify/determine that a first object in a first location of a first simulated environment may move. The training data module 1520 may also determine the direction and/or speed of the movement. The path for the simulated vehicle may be determined based on the movement of an the first object within the first virtual environment. The training data module 1520 may generate additional simulated environments based on the first simulated environment, as discussed above. In the additional simulated environments, the object that is at the first location may move in the same direction and/or at the same speed as the first object in the first simulated environment. Thus, the moving objects in the first simulated environment and the additional simulated environments will move in the same directions and/or at the same speeds. This may allow the same path to be used in the first simulated environment and the additional simulated environments.

In one embodiment, the training data module 1520 may tag the set of images based the set of simulated environments, the set of locations, and the set of non-deterministically generated objects. For example, the simulated environment may include objects with a particular shape/size/texture and the view/image of the simulated environment may include a tag, annotation, label or other metadata indicating the shape/size/texture of the objects. In another example, the simulated environment may include objects with a particular shape and the view/image of the simulated environment may include a tag, annotation, label or other metadata indicating the shape of the objects.

In one embodiment, the training data module 1520 may train a vehicle guidance model (e.g., vehicle guidance model 1480 illustrated in FIG. 3B) based on the set of images (e.g., views). For example, the training data module 1520 may provide the images to the vehicle guidance model as an input. The training data module 1520 may receive, obtain, etc., the output (e.g., steering data) of the vehicle guidance model and may compare the output of the vehicle guidance model with an expected output (e.g., reference steering data, expected steering data, etc.). The output of the vehicle guidance model may be analyzed to determine whether the vehicle guidance model is operating properly and/or is ready for further testing or deployment onto vehicles. For example, if the output of the vehicle guidance model varies from the expected output by more than a threshold (e.g., the output steering angle varies from a reference steering angle by more than a threshold angle), the training data module 1520 may provide an indication to a user (e.g., a message, a prompt, etc.) to indicate that the vehicle guidance model is not providing acceptable output. In another embodiment, the training data module 1520 may also validate and/or test the vehicle guidance model using a portion of the set of images. For example, a first portion of the set of images may be used to train the vehicle guidance model. A second portion of the set of images may be used to validate/test the vehicle guidance model.

As discussed above, training data is useful and/or important when developing vehicle guidance models (e.g., machine learning models, neural networks, etc.). Obtaining training data is often a difficult, inefficient, and time consuming process. For example, gather real world images and/or video of real world locations/environments may be a time consuming task. A driver may have to drive a vehicle around for one hour to gather one hour's worth of video. In addition, the data that is gathered or collected by drivers may not reflect possible scenarios, conditions, situations, circumstances, and/or environments that may occur. In addition, it may be useful to have the vehicle guidance models generalize better to different scenarios, conditions, situations, circumstances, and/or environments. This may be difficult if the training data does not account for the different scenarios, conditions, situations, circumstances, and/or environments. For example, overfitting on the training data may cause a machine learning model to fail to generate proper output for new or different data.

In one embodiment, the training data module 1520 may be able to generate tens, hundreds, thousands, millions, etc., of simulated environments. The size, text, color, shape, etc., of the objects in the simulated environments may be non-deterministically (e.g., randomly) changed between the different simulated environments. Random primitive shaped objects as well as unrealistic fuzzy objects. The lighting (e.g., lighting, glare, sources of light, shadows, etc.) and/or weather conditions may also be non-deterministically changed in different simulated environments. The terrain (e.g., desert, road, forest, mountains, etc.) may also be non-deterministically changed in different simulated environments. The road type (e.g., asphalt, dirt, concrete, paved stones, etc.) may also be non-deterministically changed in different simulated environments. The road color and/or texture may also be non-deterministically changed in different simulated environments. In addition, the amount of light reflection on a road may also be non-deterministically changed in different simulated environments. This may allow the training data module 1520 to generate a multitude of images (e.g., training data) with varying objects, environments, lighting, terrain, textures, etc. The large number of variations in training data (e.g., the large number of varying objects, textures, environments, etc.) may be difficult to obtain in real world scenarios. In addition, some of the training data may depict scenarios that may not be possible in the real world. For example, it may not be possible to have snow (e.g., a weather condition) in a desert on a hot day.

The training data that may be generated by the training data module 1520 may allow the vehicle guidance model to generalize better in different scenarios, conditions, situations, circumstances, and/or environments. Because the training data module 1520 may randomly vary objects, routes, textures, terrain, weather/light conditions, etc., this may expose the vehicle guidance model to more variations in training data which may help prevent overfitting. In addition, because of the multiple of variations in the training data (e.g., the images), the training data may include various corner cases or unlikely scenarios, conditions, situations, circumstances, and/or environments which may also be useful when training the vehicle guidance model. Furthermore, the training data generated by the training data module 1520 may be generated automatically, which may reduce the time and effort for creating/obtaining training data.

In some embodiments, vehicle guidance models may be trained with training data that includes only unrealistic/abstract objects. The use of abstract/unrealistic objects may help prevent the overfitting of the vehicle guidance models to known, realistic objects and allow the vehicle guidance models to generalize to broader scenarios. Also generation of the training data and scenarios (which includes the abstract/unrealistic objects) may be more cost efficient when compared to using realistic or hi-fidelity simulation models of realistic scenarios. This technique may allow a larger amount of training data to be generated when compared to using only realistic objects (e.g., hi-fidelity simulation models of real objects) in the training data. The embodiments, examples, and/or limitations described herein may also be used in cases where the access to realistic data is limited, such as, accident scenes/scenarios or scenarios that include construction sites.

Figure 5A:
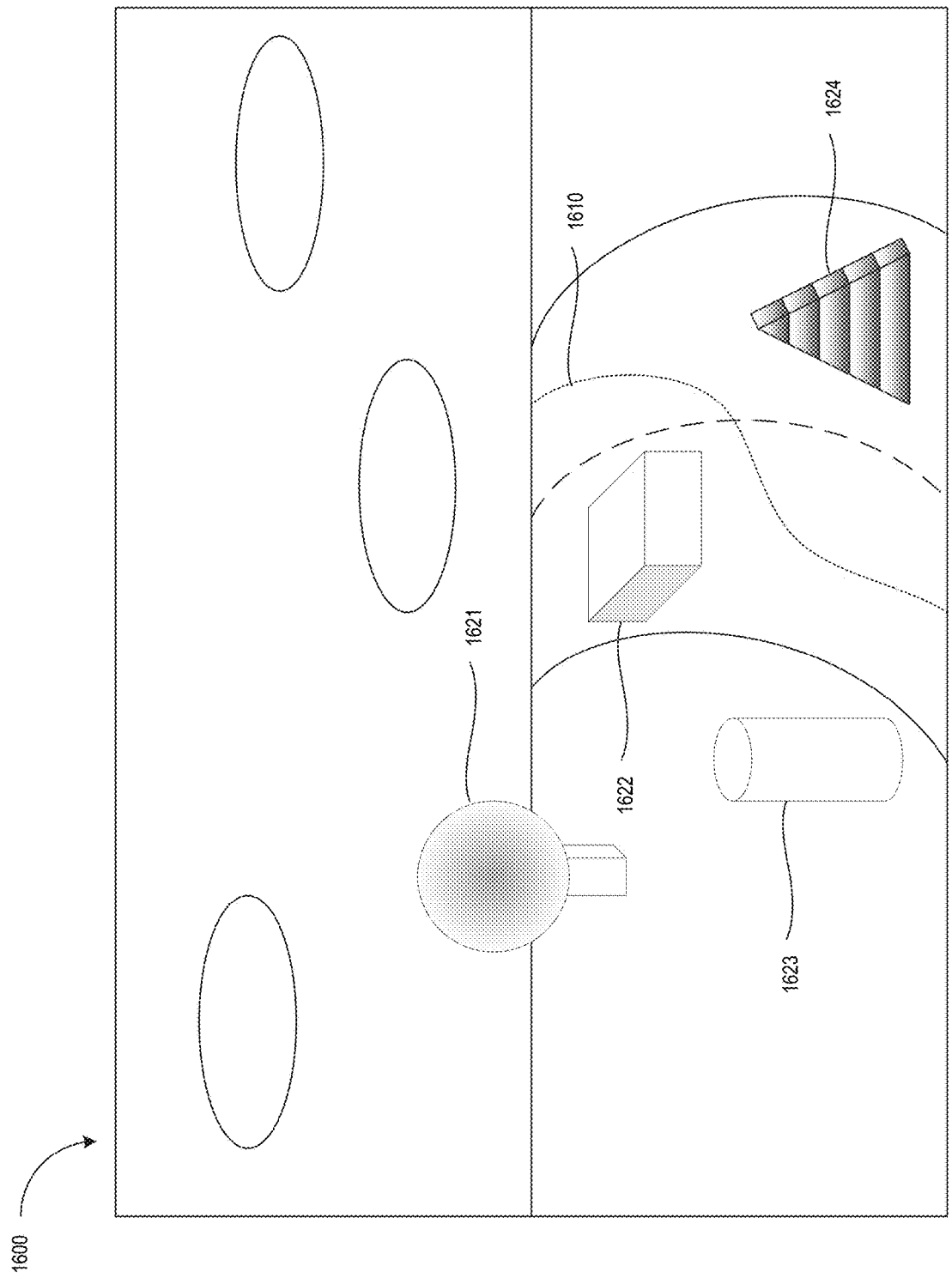
FIG. 5A is a diagram illustrating an example image, in accordance with one or more embodiments of the present disclosure.

FIG. 5A is a diagram illustrating an example image 1600, in accordance with one or more embodiments of the present disclosure. The image 1600 may depict a view of a portion of a simulated environment that was captured, obtained, etc., while a simulated vehicle (or other simulated object) was moving along the path 1610.

As discussed above, a simulated environment may include various objects 1621, 1622, 1623, and 1624 (e.g., simulated objects, virtual objects, etc.) that are in various locations in the simulated environment. The objects 1621, 1622, 1623, and 1624 may be non-deterministically generated, as discussed above. For example, the sizes, shapes, orientations, textures, etc., of the objects 1621, 1622, 1623, and 1624 may be randomly selected. The weather conditions and/or lighting conditions (e.g., sources of light, locations of light sources and/or light, shadows, locations of shadows, darkness of shadows, glare, reflections, etc.) may also be non-deterministically selected or determined. For example, the locations of the ovals (which may represent clouds) may be randomly selected. As illustrated in FIG. 5A, the objects 1621, 1622, 1623, and 1624 may not be realistic objects. For example, the objects 1621, 1622, 1623, and 1624 may not be visual similar to real world objects (e.g., may not be images or textures of real world objects).

Figure 5B:
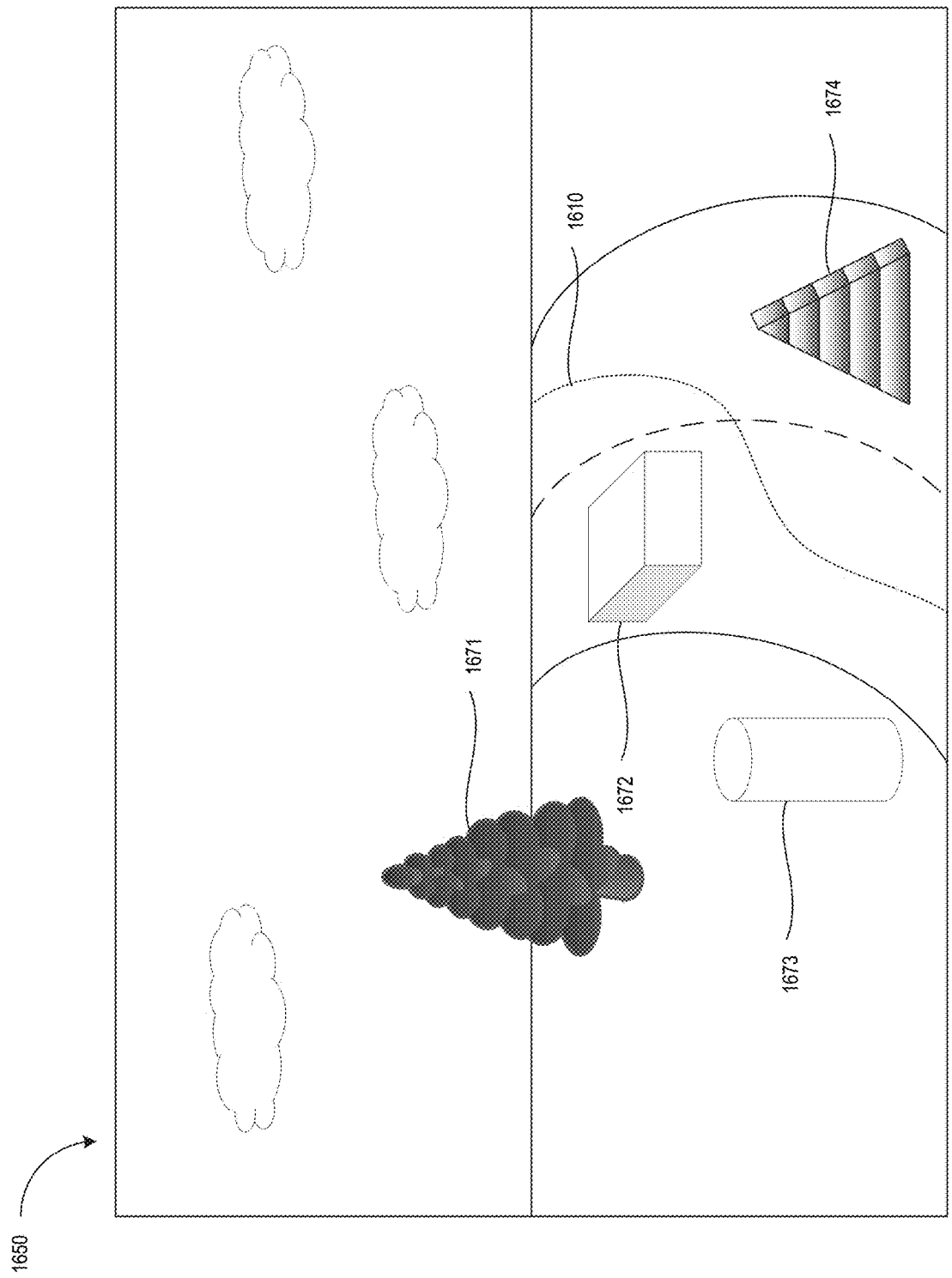
FIG. 5B is a diagram illustrating an example image, in accordance with one or more embodiments of the present disclosure.

FIG. 5B is a diagram illustrating an example image 1650, in accordance with one or more embodiments of the present disclosure. The image 1650 may depict a view of a portion of another simulated environment that was captured, obtained, etc., while a simulated vehicle (or other simulated object) was moving along the path 1610.

As discussed above, a simulated environment may include various objects 1671, 1672, 1673, and 1674 (e.g., simulated objects, virtual objects, etc.) that are in various locations in the simulated environment. The objects 1671, 1672, 1673, and 1674 may be non-deterministically generated, as discussed above. For example, the sizes, shapes, orientations, textures, etc., of the objects 1671, 1672, 1673, and 1674 may be randomly selected. The weather conditions and/or lighting conditions (e.g., sources of light, locations of light sources and/or light, shadows, locations of shadows, darkness of shadows, glare, reflections, etc.) may also be non-deterministically selected or determined. For example, the locations of the ovals (which may represent clouds) may be randomly selected. As illustrated in FIG. 5B, the objects 1672, 1673, and 1674 may not be realistic objects. For example, the objects 1622, 1623, and 1624 may not be visual similar to real world objects (e.g., may not be images or textures of real world objects). Object 1671 may be a realistic object. For example, the object 1671 may be a realistic representation of a tree. In addition, realistic images or representations of clouds are depicted in image 1650 instead of ovals (as illustrated in FIG. 5A).

As discussed above, different simulated environments may be generated. Each of the different simulated environments may include the path 1610 (as illustrated in FIG. 5A). In addition, the location of objects 1671, 1672, 1673, and 1674 in FIG. 5B are the same as the locations of the objects 1621, 1622, 1623, and 1624 in FIG. 5A.

Figure 6:
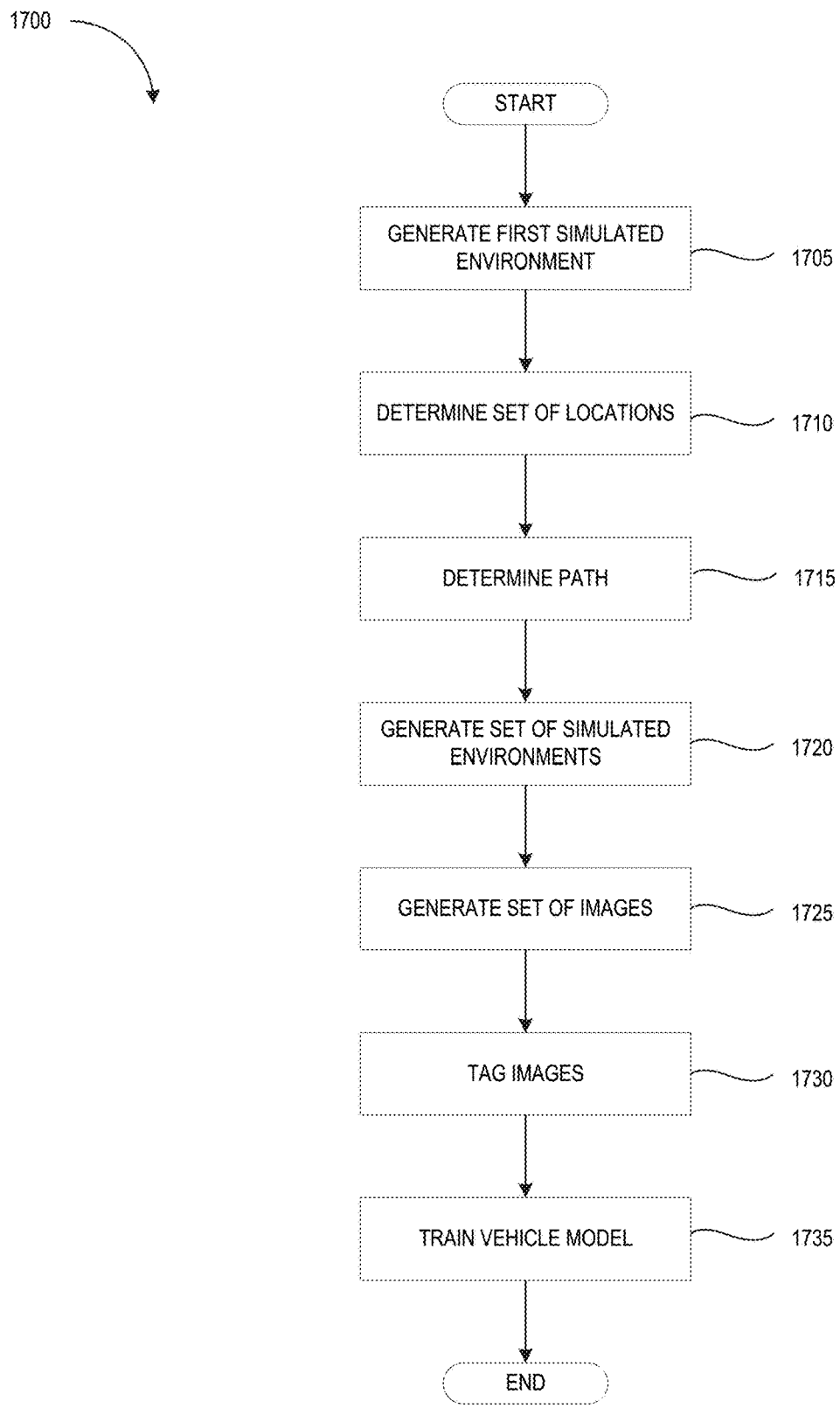
FIG. 6 is a flow diagram of a process for generating training data, in accordance with one or more embodiments of the present disclosure.

FIG. 6 is a flow diagram of a process 1700 for generating training data, in accordance with one or more embodiments of the present disclosure. Process 1700 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 1700 may be performed by a vehicle, components/systems of the vehicle (e.g., training data module and/or the test module as illustrated in FIG. 5).

The process 1700 begins at block 1705 where the process 1700 generates a first virtual environment. The first simulated environment may include a route for a simulated vehicle. The first simulated environment may be referred to as a base simulated environment or a template simulated environment. At block 1710, the process 1700 may determine a set of locations for a set of objects in the first simulated environment. For example, the process 1700 may select non-deterministic (e.g., random) locations for the objects in the first simulated environment. At block 1715, the process 1700 may determine a path for the simulated vehicle based on the route and the set of locations for the set of objects. For example, the process 1700 may determine a path for the simulated vehicle along the route. The path may avoid the one or more obstacles on the route.

At block 1720, the process 1700 may generate a set of simulated virtual environments (e.g., additional simulated environments) based on the first virtual environment. In each environment of the set of virtual environments, the process 1700 may non-deterministically vary the objects, weather conditions, lighting conditions, textures, terrain, etc. In addition, the location of the objects and the path may remain the same as the path and locations in the first virtual environment. At block 1725, the process 1700 may generate a set of images (e.g., training data) based on the set of virtual environments. For example, the process 1700 may drive or move the simulated vehicle through each simulated environment and may capture or record views of the simulated environments from the perspective of the simulated vehicle.

At block 1730, the process 1700 may optionally tag the images. For example, the process 1700 may add tags, labels, annotations, and/or other metadata to identify one or more of the objects, environments, terrain, weather conditions, lighting conditions, etc., depicted in the images. In another example, the process 1700 may add a tag, label, annotation, etc., that may indicate the steering angle of a simulated vehicle for an image. For example, for each image in a stream of images, the tag may indicate the steering angle of the simulated vehicle at the time the image was generated. At block 1735, the process 1700 may optionally train a vehicle guidance model based on the images. For example, the process 1700 may provide the images to the vehicle guidance model as input. The vehicle guidance model may be an end-to-end neural network, as discussed above.

Figure 7:
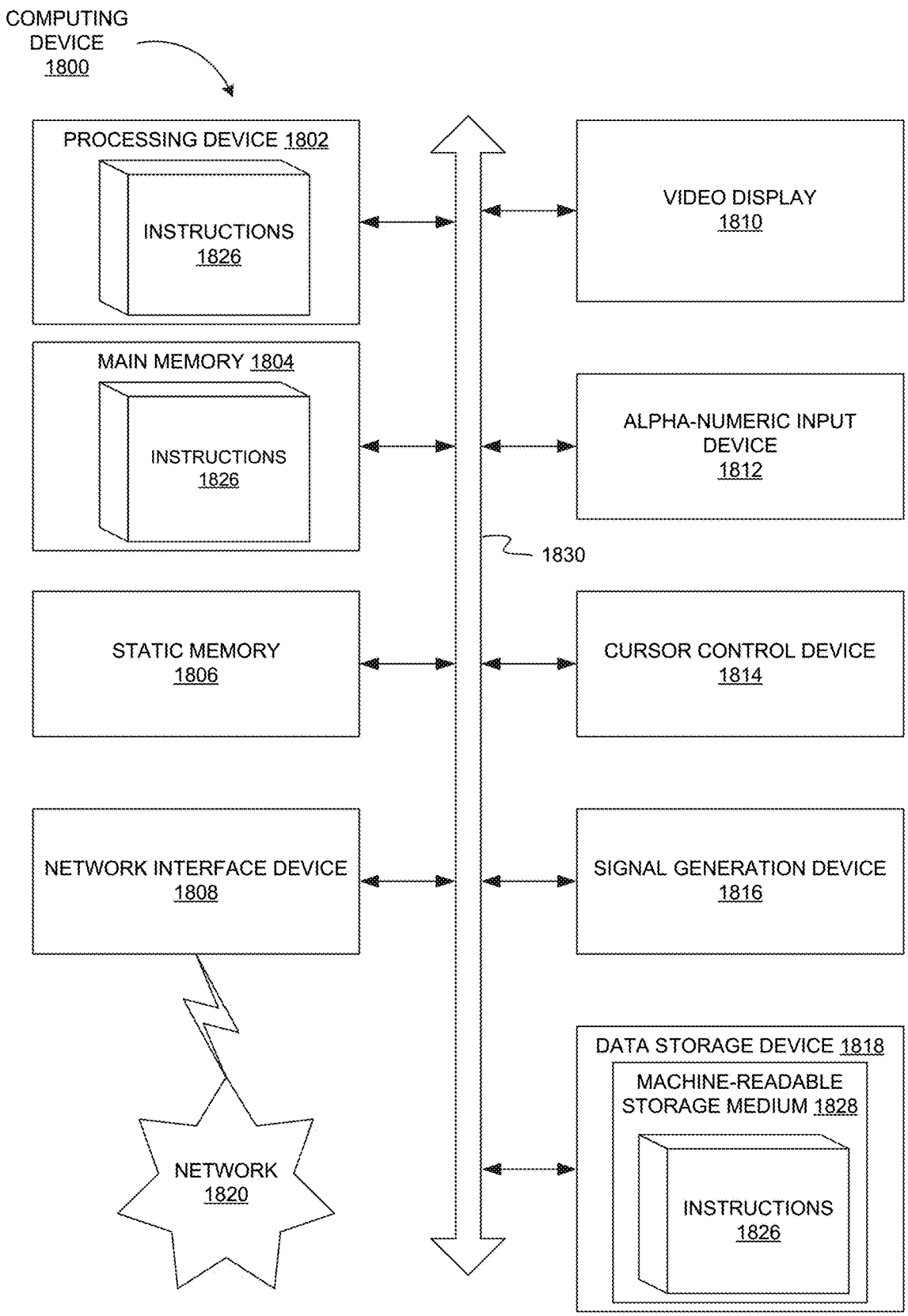
FIG. 7 is a block diagram of an example computing device that may perform one or more of the operations described herein, in accordance with some embodiments of the present disclosure.

FIG. 7 is a block diagram of an example computing device 1800 that may perform one or more of the operations described herein, in accordance with some embodiments. Computing device 1800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1800 may include a processing device (e.g., a general purpose processor, a PLD, etc.) 1802, a main memory 1804 (e.g., synchronous dynamic random access memory (DRAM), read-only memory (ROM)), a static memory 1806 (e.g., flash memory and a data storage device 1818), which may communicate with each other via a bus 1830.

Processing device 1802 may be provided by one or more general-purpose processing devices such as a microprocessor, central processing unit, or the like. In an illustrative example, processing device 1802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1802 may also comprise one or more special-purpose processing devices such as an application specific integrated circuit (ASIC), a field programmable gate array (FPGA), a digital signal processor (DSP), network processor, or the like. The processing device 1802 may be configured to execute the operations described herein, in accordance with one or more aspects of the present disclosure, for performing the operations and steps discussed herein.

Computing device 1800 may further include a network interface device 1808 which may communicate with a network 1820. The computing device 1800 also may include a video display unit 1810 (e.g., a liquid crystal display (LCD) or a cathode ray tube (CRT)), an alphanumeric input device 1812 (e.g., a keyboard), a cursor control device 1814 (e.g., a mouse) and an acoustic signal generation device 1816 (e.g., a speaker). In one embodiment, video display unit 1810, alphanumeric input device 1812, and cursor control device 1814 may be combined into a single component or device (e.g., an LCD touch screen).

Data storage device 1818 may include a computer-readable storage medium 1828 on which may be stored one or more sets of instructions, e.g., instructions for carrying out the operations described herein, in accordance with one or more aspects of the present disclosure. Instructions 1826 implementing the different systems described herein (e.g., the data science system 110, the test module 910, the simulation engine 1510, and/or training data module 1520 illustrated in FIGS. 1-4) may also reside, completely or at least partially, within main memory 1804 and/or within processing device 1802 during execution thereof by computing device 1800, main memory 1804 and processing device 1802 also constituting computer-readable media. The instructions may further be transmitted or received over a network 1820 via network interface device 1808.

While computer-readable storage medium 1828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "determining," "training," "driving," "obtaining," "tagging," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
generating a first simulated environment, wherein the first simulated environment comprises a route for a simulated vehicle;
determining a set of locations within the first simulated environment for a set of objects, wherein the set of locations is determined non-deterministically;
determining a path for the simulated vehicle based on the route and the set of locations;
generating a set of simulated environments based on the first simulated environment and the set of locations, wherein:
the set of simulated environments comprise the route for the simulated vehicle; and
each simulated environment of the set of simulated environments comprises a set of non-deterministically generated objects located at the set of locations;
generating a set of images based on the set of simulated environments, the path, and the set of non-deterministically generated objects; and
training an end-to-end vehicle guidance model based on the set of images.

2. The method of claim 1, wherein one or more of:
sizes of the set of non-deterministically generated objects are selected non-deterministically;
shapes of the set of non-deterministically generated objects are selected non-deterministically; and
orientations of the set of non-deterministically generated objects are selected non-deterministically.

3. The method of claim 1, wherein generating the set of images comprises:
driving the simulated vehicle along the path in each simulated environment of the set of simulated environments; and
obtaining the set of images as the simulated vehicle drives along the path in each simulated environment of the set of simulated environments.

4. The method of claim 1, wherein each simulated environment of the set of simulated environments comprises a non-deterministically selected weather condition.

5. The method of claim 1, wherein each simulated environment of the set of simulated environments comprises a non-deterministically selected lighting condition.

6. The method of claim 1, wherein the path for the simulated vehicle is determined further based on user input.

7. The method of claim 1, wherein:
a subset of the set of non-deterministically generated objects move within a respective simulated environment; and
the path for the simulated vehicle is further based on movements of the subset of the set of non-deterministically generated objects.

8. The method of claim 1, wherein:
the set of images depict views of the set of simulated environments, and wherein the views of the set of simulated environments correspond to a location of a sensor within a vehicle associated with the simulated vehicle.

9. The method of claim 1, wherein:
the end-to-end vehicle guidance model comprises a deep driving neural network configured to receive a stream of images as input and generate corresponding steering commands as output; and
the steering command indicates one or more of a direction and an angle of movement for the simulated vehicle.

10. The method of claim 1, wherein the set of non-deterministically generated objects comprises one or more of unrealistic objects and realistic objects.

11. The method of claim 1, further comprising:
tagging the set of images based on one or more of the set of simulated environments, the set of locations, and the set of non-deterministically generated objects.

12. An apparatus, comprising:
a memory configured to store data; and
a processing device coupled to the memory, the processing device configured to:
generate a first simulated environment, wherein the first simulated environment comprises a route for a simulated vehicle;
determine a set of locations within the first simulated environment for a set of objects, wherein the set of locations is determined non-deterministically;
determine a path for the simulated vehicle based on the route;
generate a set of simulated environments based on the first simulated environment and the set of locations, wherein:
the set of simulated environments comprise the route for the simulated vehicle; and
each simulated environment of the set of simulated environments comprises a set of non-deterministically generated objects located at the set of locations;
generate a set of images based on the set of simulated environments, the path, and the set of non-deterministically generated objects; and
train an end-to-end vehicle guidance model based on the set of images.

13. The apparatus of claim 12, wherein one or more of:
sizes of the set of non-deterministically generated objects are selected non-deterministically;

shapes of the set of non-deterministically generated objects are selected non-deterministically; and orientations of the set of non-deterministically generated objects are selected non-deterministically.

14. The apparatus of claim 12, wherein to generate the set of images the processing device is further configured to:

drive the simulated vehicle along the path in each simulated environment of the set of simulated environments; and obtain the set of images as the simulated vehicle drives along the path in each simulated environment of the set of simulated environments.

15. The apparatus of claim 12, wherein each simulated environment of the set of simulated environments comprises a non-deterministically selected weather condition.

16. The apparatus of claim 12, wherein each simulated environment of the set of simulated environments comprises a non-deterministically selected lighting condition.

17. The apparatus of claim 12, wherein:

a subset of the set of non-deterministically generated objects move within a respective simulated environment; and the path for the simulated vehicle is further based on movements of the subset of the set of non-deterministically generated objects.

18. The apparatus of claim 12, wherein:

the set of images depict views of the set of simulated environments, and wherein the views of the set of simulated environments correspond to a location of a sensor within a vehicle associated with the simulated vehicle.

19. The apparatus of claim 12, wherein:

the end-to-end vehicle guidance model comprises a deep driving neural network configured to receive images as input and generate steering commands as output; and the steering command indicates one or more of a direction and an angle of movement for the simulated vehicle.

20. A non-transitory computer-readable storage medium including instructions that, when executed by a processing device, cause the processing device to perform operations comprising:

generating a first simulated environment, wherein the first simulated environment comprises a route for a simulated vehicle;

determining a set of locations within the first simulated environment for a set of objects, wherein the set of locations is determined non-deterministically;

determining a path for the simulated vehicle based on the route;

generating a set of simulated environments based on the first simulated environment and the set of locations, wherein:

the set of simulated environments comprise the route for the simulated vehicle; and each simulated environment of the set of simulated environments comprises a set of non-deterministically generated objects located at the set of locations;

generating a set of images based on the set of simulated environments, the path, and the set of non-deterministically generated objects; and training an end-to-end vehicle guidance model based on the set of images.

* * * * *